US010877497B2

(12) United States Patent
Shreve

(10) Patent No.: US 10,877,497 B2
(45) Date of Patent: *Dec. 29, 2020

(54) SYSTEM AND METHOD FOR MINIMIZATION OF FORCE VARIATION IN A SOLENOID WITHIN A PRESSURIZED FLOW SYSTEM

(71) Applicant: WATERS TECHNOLOGIES CORPORATION, Milford, MA (US)

(72) Inventor: Joshua A. Shreve, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/381,980

(22) PCT Filed: Mar. 7, 2013

(86) PCT No.: PCT/US2013/029531
§ 371 (c)(1),
(2) Date: Aug. 28, 2014

(87) PCT Pub. No.: WO2013/134473
PCT Pub. Date: Sep. 12, 2013

(65) Prior Publication Data
US 2015/0014563 A1  Jan. 15, 2015

Related U.S. Application Data

(60) Provisional application No. 61/607,943, filed on Mar. 7, 2012.

(51) Int. Cl.
G05D 16/20 (2006.01)
F16K 31/06 (2006.01)
(Continued)

(52) U.S. Cl.
CPC ..... *G05D 16/2013* (2013.01); *F16K 31/0675* (2013.01); *G05D 16/024* (2019.01);
(Continued)

(58) Field of Classification Search
CPC ..... F16K 1/38; F16K 31/0655; F16K 31/0675
See application file for complete search history.

(56) References Cited

U.S. PATENT DOCUMENTS 2,814,689 A    11/1957  Roche
3,508,020 A     4/1970  Culver
(Continued)

FOREIGN PATENT DOCUMENTS

DE          19918070 A1    12/1999
DE    10 2005 056 441 A1   7/2006
(Continued)

OTHER PUBLICATIONS

Guiochon G, et al., Fundamental challenges and opportunities for preparative supercritical fluid chromatography. J Chromatogr A. Feb. 25, 2011;1218(8):1037-114.
(Continued)

*Primary Examiner* — Eric Keasel
(74) *Attorney, Agent, or Firm* — Womble Bond Dickinson (US) LLP; Deborah M. Vernon; Heath T. Misley

(57) ABSTRACT

Exemplary embodiments are directed to systems and methods used to minimize force variation from a solenoid through an operating stroke. The systems and methods generate a near constant or substantially constant force solenoid assembly which can be used in a force driven device, such as, for example, a pressure regulator for accurately controlling pressure in a pressurized flow system. The systems and methods are based on an initial solenoid characterization and include an application of springs and placement of the solenoid within the system at a gap distance to
(Continued)

minimize variation in force in the operating stroke of a commercially available solenoid.

17 Claims, 12 Drawing Sheets

(51) Int. Cl.
    *G05D 16/00*     (2006.01)
    *B01D 15/16*     (2006.01)
    *B01D 15/40*     (2006.01)

(52) U.S. Cl.
    CPC ....... *G05D 16/2022* (2019.01); *B01D 15/163* (2013.01); *B01D 15/40* (2013.01)

(56) References Cited

U.S. PATENT DOCUMENTS

| | | | |
|---|---|---|---|
| 3,635,240 A * | 1/1972 | Vischulis | F15B 15/2853 137/495 |
| 3,689,055 A | 9/1972 | Gende | |
| 4,393,994 A * | 7/1983 | Rieck | F02M 51/0671 239/585.2 |
| 4,635,683 A | 1/1987 | Nielsen | |
| 6,683,519 B1 * | 1/2004 | Schanzel | H01F 7/081 335/258 |
| 6,920,964 B1 * | 7/2005 | Mackiewicz | F16D 65/18 188/262 |
| 9,341,277 B2 * | 5/2016 | Shreve | G01N 30/32 |
| 2006/0157115 A1 | 7/2006 | Dorogi et al. | |

FOREIGN PATENT DOCUMENTS

| | | |
|---|---|---|
| DE | 20321276 U1 | 10/2006 |
| DE | 10 2008 060 238 A1 | 5/2010 |
| IE | 10 2005 048 545 A1 | 4/2007 |

OTHER PUBLICATIONS

International Search Report for PCT/US2013/29531 dated May 8, 2013.

* cited by examiner

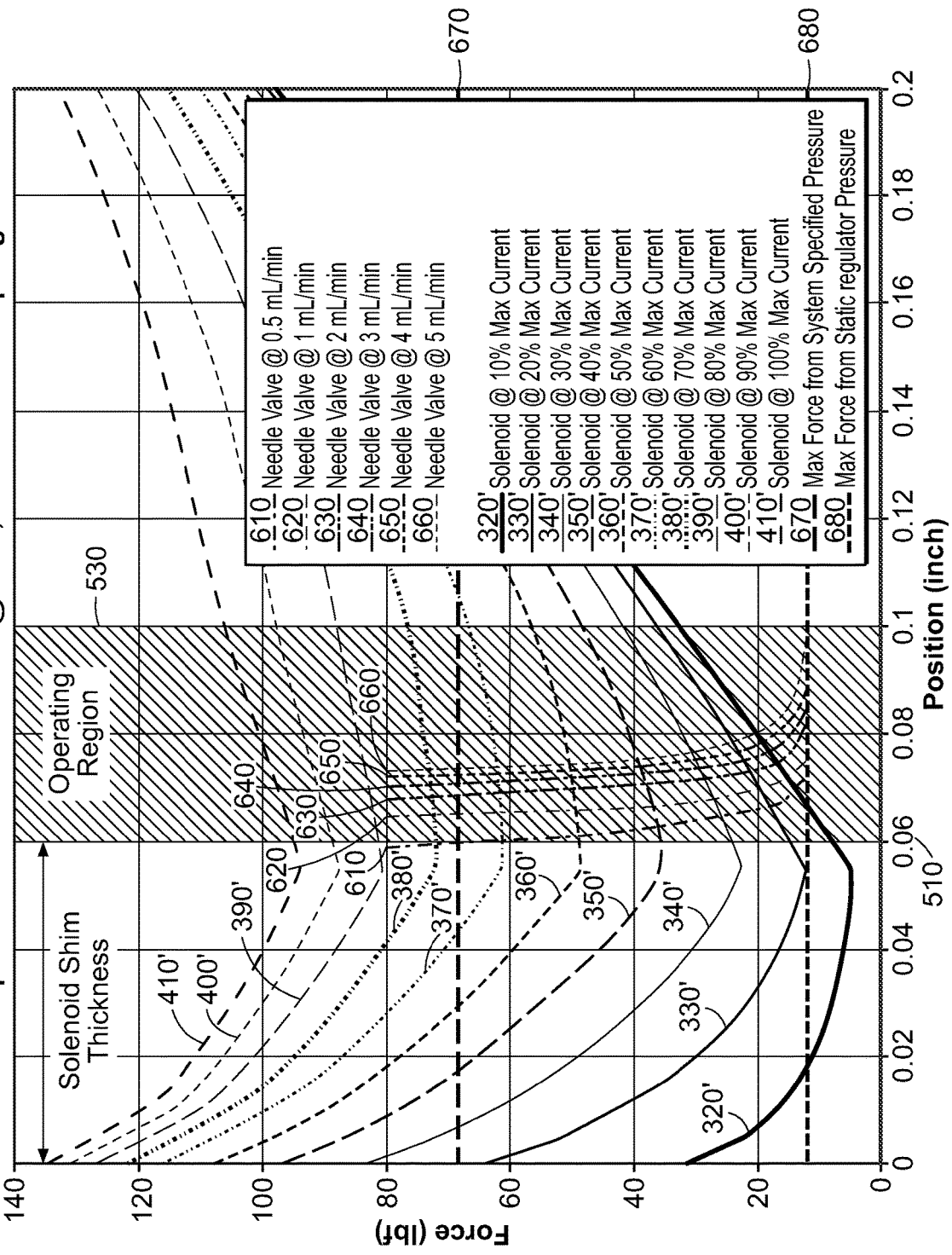

SYSTEM AND METHOD FOR MINIMIZATION OF FORCE VARIATION IN A SOLENOID WITHIN A PRESSURIZED FLOW SYSTEM

RELATED APPLICATIONS

This application is a National Stage Application of International Application No. PCT/US2013/029531, filed Mar. 7, 2013, which claims priority to U.S. Provisional Application No. 61/607,943, filing date Mar. 7, 2012. Each of the foregoing applications is incorporated herein by reference in its entirety.

TECHNICAL FIELD

The present disclosure relates to systems and methods that minimize force variation in a solenoid, and, in particular, to systems and methods that create a near constant or substantially constant force for a solenoid through an operating stroke for controlling pressure in a pressurized flow application, such as, for example $CO_2$-based chromatography.

BACKGROUND

Chromatographic techniques are important tools for the identification and separation of complex samples. The basic principle underlying chromatographic techniques is the separation of a mixture into individual components by transporting the mixture in a moving fluid through a retentive media. The moving fluid is typically referred to as the mobile phase and the retentive media is typically referred to as the stationary phase. The separation of the various constituents of the mixture is based on differential partitioning between the mobile and stationary phases. Differences in components' partition coefficient result in differential retention on the stationary phase, resulting in separation.

Conventionally, the methods of choice for chromatographic separations have been gas chromatography (GC) and liquid chromatography (LC). One major difference between GC and LC is that the mobile phase in GC is a gas, whereas the mobile phase in LC is a liquid. For example, in GC, a supply of inert carrier gas (mobile phase) is continually passed as a stream through a heated column containing porous sorptive media (stationary phase). A sample of the subject mixture is injected into the mobile phase stream and passed through the column, where separation of the mixture is primarily due to the differences in the volatile characteristics of each sample component at the temperature of the column. A detector, positioned at the outlet end of the column, detects each of the separated components as they exit the column. Although GC is typically a sensitive method of analysis, the high temperatures required in GC make this method unsuitable for high molecular weight biopolymers or proteins (heat will denature them), frequently encountered in biochemistry.

Conversely, LC is a separation technique in which the mobile phase is a liquid and does not require volatilization of the sample. Liquid chromatography that generally utilizes small packing particles and moderately high pressure is referred to as high-performance liquid chromatography (HPLC); whereas liquid chromatography that generally utilizes very small packing particles and high pressure is referred to as ultra-high performance liquid chromatography (UHPLC). In HPLC and UHPLC the sample is forced by a liquid at high pressure (the mobile phase) through a column that is packed with a stationary phase composed of irregularly or spherically shaped particles, a porous monolithic layer, or a porous membrane.

Because LC uses liquid as the mobile phase, LC techniques are capable of analyzing higher molecular weight compounds and, in some cases, LC can be used to prepare large scale batches of purified protein(s). However, in contrast, GC techniques are typically more sensitive and readily allow for the separation of single chiral materials. Thus, GC has conventionally been used to isolate and determine the relative purity of a chiral compound, e.g., by determining the enantiomeric excess (% ee) or the diastereomeric excess (% de) of a particular sample. As with most chromatographic techniques, the limiting factor in both GC and LC has been the ability to obtain and/or reproduce pure sample separations, each of which are typically dependent on the apparatus, methods, and conditions employed, e.g., flow rate, column size, column packing material, solvent gradient, etc.

Supercritical Fluid Chromatography is another chromatographic technique, which has typically been used in preparative applications. For every liquid substance there is a temperature above which it can no longer exist as a liquid, no matter how much pressure is applied. Likewise, there is a pressure above which the substance can no longer exist as a gas no matter how much the temperature is raised. These points are called the supercritical temperature and supercritical pressure, and define the boundaries on a phase diagram for a pure substance (FIG. 1). At this point, the liquid and vapor have the same density and the fluid cannot be liquefied by increasing the pressure. Above this point, where no phase change occurs, the substance acts as a supercritical fluid (SF). Thus, SF can be described as a fluid obtained by heating above the critical temperature and compressing above the critical pressure. There is a continuous transition from liquid to SF by increasing temperature at constant pressure or from gas to SF by increasing pressure at constant temperature.

The term SFC, while typically standing for Supercritical Fluid Chromatography, does not require or mean that supercritical conditions are obtained during or maintained throughout the separation. That is, columns do not have to be always operated in the critical region of the mobile phase. For example, in the event that the mobile phase includes a modifier (e.g., $CO_2$ and methanol as a modifier), the mobile phase is often in its subcritical region (e.g., a highly compressed gas or a compressible liquid rather than a supercritical fluid). In fact, as Guiochon et al note in section 2.3 of their review article entitled "Fundamental challenges and opportunities for preparative supercritical fluid chromatography" Journal of Chromatography A, 1218 (2011) 1037-1114: "It is obvious that SFC has very often been and still is run under subcritical conditions." Thus, the term SFC is not limited to processes requiring supercritical conditions.

Because SFC typically uses $CO_2$, SFC processes are inexpensive, innocuous, eco-friendly, and non-toxic. There is typically no need for the use of volatile solvent(s) (e.g., hexane). Finally, the mobile phase in SFC processes (e.g., $CO_2$ together with any modifier/additive as a SF, highly compressed gas, or compressible liquid) typically have higher diffusion constants and lower viscosities relative to liquid solvents. The low viscosity means that pressure drops across the column for a given flow rate is greatly reduced. The increased diffusivity means longer column length can be used.

SUMMARY

Exemplary embodiments of the present technology are directed to systems and methods for creating a near or substantially constant force from a solenoid through its operating stroke. In general, commercially available solenoids generate a nonlinear force that varies along its stroke making commercially available solenoids undesirable for use as an actuator in a force driven system, such as, for example, a pressure regulator in a pressurized flow system. In embodiments of the present technology, methods and systems are provided to assemble a near constant (e.g., substantially constant) force from a solenoid through its operating stroke. Embodiments include characterization of the solenoid through its stroke and application of an assembly of balancing springs and shims to space or gap the solenoid within the force driven system. The balancing springs can be linear (e.g., compression springs) or nonlinear (e.g., Belleville stacks). Exemplary embodiments of a method to minimize force variation for a solenoid includes: (a) characterization of force, current and stroke for a given solenoid, (b) identification of a linear region within the stroke having sufficient load for force applications at desired currents; (c) application of shims or spacers to create a gap to match a start position of the identified linear region; and (d) application of a spring to flatten a load profile in an operating region to minimize force variation within the stroke of the solenoid. Embodiments, while not guaranteeing a constant force from a standard, commercially available solenoid, provide a minimization of force variation within the stroke of the operating region, allowing the commercially available solenoid, as modified by the systems and methods herein, to be utilized in a pressure regulator of a flow system such as, for example, a $CO_2$-based chromatography system.

In accordance with an aspect of the present disclosure, pressure regulators including a body section, a head section, and an actuator section are disclosed. The head section of the pressure regulator includes a needle and a seat defining a bore. The needle and seat are positioned such that movement of the needle within the bore of the seat creates a pressure differential through the seat when a flow of a fluid is supplied to the head section. The actuator section is located at least partially within the body section and is positioned to communicate with the needle to move the needle within the bore of the seat. The actuator section includes a shaft driven in a first direction by a solenoid and a balancing spring. The solenoid applies a negative spring rate to the shaft in the first direction and the balancing spring applies a positive spring rate to the shaft in the first direction. The value of the positive spring rate is greater than the negative spring rate of the solenoid to provide an overall positive spring rate in the first direction to the shaft.

Embodiments of the above exemplary pressure regulator can include one or more of the following features. In embodiments, the pressure regulator is used to control pressure in a $CO_2$-based chromatography system. In other embodiments, the pressure regulator is used to control pressure in other pressurized flow systems, such as supercritical fluid extraction systems or HPLC systems. In embodiments, the actuator section is positioned at a distance (e.g., 0.01 inches) from the body section such that a distal end of the needle is disposed within the body section. In some embodiments, a plastic or other non-magnetic material shim is used to position the solenoid within the device. In particular, the shim is used to create a gap within an operating region of the stroke of the solenoid. In general, the gap is equal to or substantially equal to a stroke distance marking the beginning of the linear region identified by characterizing the solenoid. In embodiments, the gap created by the shim is less than about 0.2 inches. Embodiments also feature a compression collar to preload the balancing spring to apply the positive spring rate. In some embodiments, the balancing spring is a linear spring, such as, for example, a compression coil. In general, linear springs change force at a constant rate with respect to change in relative displacement. In other embodiments, the balancing spring is a nonlinear spring, such as, for example, a Belleville stack. In general, nonlinear springs have a more complex relationship between force and displacement. Behavior of the pressure regulators in accordance with the present technology generally depends on additive effects of the solenoid spring rate and the balancing spring rate. Thus, use of different types of balancing springs to provide different balancing spring rates can be used to address solenoid nonlinearities along one or more portions of a force versus displacement curve. An advantage of using a non-linear spring is that in addition to applying a positive spring rate, non-linear springs can be designed to counteract specific solenoid nonlinearities. It is noted that any combination or permutation of embodiments is envisioned.

In accordance with another aspect of the present technology, exemplary methods for minimization of force variation in a solenoid driven pressure regulator are disclosed. The exemplary methods include the steps of: (a) obtaining data of solenoid force versus current applied to the solenoid over a solenoid stroke distance; (b) using the data, determining a first stroke distance bounding a linear force region for a desired current applied region; (c) determining a spring rate constant of the solenoid in a region of operation; (d) applying a device having a spring rate with a value which is opposite of and greater than the spring rate constant of the solenoid in the region of operation, such that a shaft of the solenoid is biased to extend in a first direction in a non-operating state of the solenoid; and (e) positioning the solenoid within the body section of the pressure regulator such that a gap in solenoid stroke operation equal in distance (or substantially equal) to the first stroke distance is created.

Embodiments of the above exemplary methods can include one or more of the following features. In embodiments, the method is used to modify a commercially available solenoid for use in a $CO_2$-based chromatography system. In other embodiments, the method is used to modify a commercially available solenoid for use in other pressurized flow systems, such as supercritical fluid extraction systems or HPLC systems. In some embodiments, the pressure regulator includes a body section in which the solenoid is located. The pressure regulator can further include a head section including a needle valve, wherein the solenoid is in physical communication with a needle of the needle valve during pressure regulation. In some embodiments, the gap is between about 0.02 inches and about 0.2 inches. In other embodiments, the gap is between about 0.005 inches and about 0.3 inches. In general, the method of the present technology is performed once at the time the solenoid is placed into the system. However, in some embodiments, the methods can be performed again at maintenance events or at reconfiguration events (e.g., new components introduced into the pressure regulator to change operating conditions). It is noted that any combination or permutation of embodiments is envisioned.

In accordance with a further aspect of the present disclosure, pressure regulators including an actuator section in communication with a variable restrictor assembly are disclosed. The actuator section includes a shaft driven in a first direction by a solenoid and a balancing spring. The solenoid applies a negative spring rate to the shaft in the first direction and the balancing spring applies a positive spring rate to the shaft in the first direction. The value of the positive spring rate is greater than the negative spring rate of the solenoid to provide an overall positive spring rate in the first direction to the shaft.

Embodiments of the above exemplary pressure regulator can include one or more of the following features. In embodiments, the pressure regulator is used to control pressure in a $CO_2$-based chromatography system. In other embodiments, the pressure regulator is used to control pressure in other pressurized flow systems, such as supercritical fluid extraction systems or HPLC systems. In some embodiments, a plastic or other non-magnetic material shim is used to position the solenoid within the device. In particular, the shim is used to create a gap within an operating region of the stroke of the solenoid. In general, the gap is equal to or substantially equal to a stroke distance marking the beginning of the linear region identified by characterizing the solenoid. In embodiments, the gap created by the shim is less than about 0.2 inches. Embodiments also feature a compression collar to preload the balancing spring to apply the positive spring rate. In some embodiments, the balancing spring is a linear spring, such as, for example, a compression coil. In other embodiments, the balancing spring is a non-linear spring, such as, for example, a Belleville stack. In some embodiment, the variable restriction assembly includes a needle valve. In other embodiments, the variable restriction assembly includes a poppet valve. In still yet other embodiments, the variable restriction assembly includes a diaphragm valve. Any combination or permutation of embodiments is envisioned.

The exemplary systems and methods of the present disclosure provide numerous advantages. For example, by incorporating one or more of the exemplary systems and/or methods of the present disclosure into a force driven device in a pressurized flow system, the device can be accurately controlled. For example, by incorporating the systems and/or methods of the present disclosure into a pressure regulator wherein a solenoid is used as the actuator, pressure can be accurately controlled throughout the operating stroke. As a result, solenoids, rather than expensive voice coils, can be used to drive pressure regulators in pressurized flow systems, such as $CO_2$-based chromatography systems, in which pressure of the mobile phase has a strong influence on its ability to elute samples off of a chromatography column. The solenoids, and their systems or assemblies used to minimize force variation are, in general, inexpensive to produce and operate (e.g., require minimal power to create desired force), thereby providing significant cost savings.

BRIEF DESCRIPTION OF THE DRAWINGS

The foregoing and other features and advantages provided by the present disclosure will be more fully understood from the following description of exemplary embodiments when read together with the accompanying drawings, in which:

FIGS. 11(a) and 11(b) each show the graph of FIG. 10 with the operating region also identified.

DESCRIPTION OF EXEMPLARY EMBODIMENT

Figure 1:
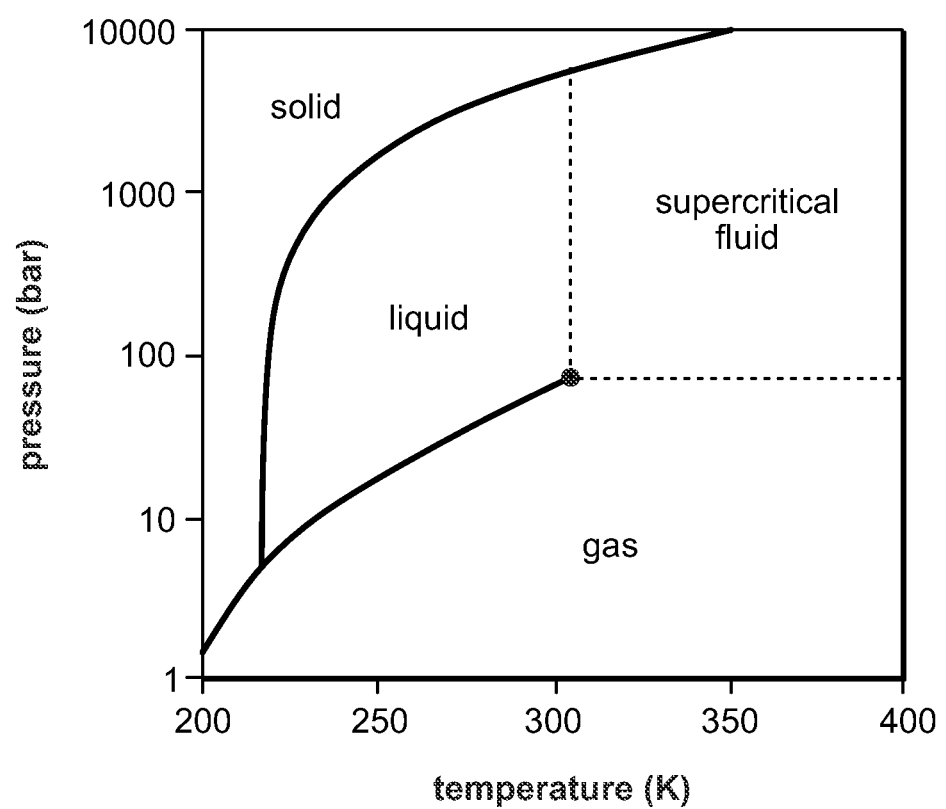
FIG. 1 is an exemplary graph of the physical state of a substance in relation to a temperature and pressure associated with the substance.

SFC can be adapted as a hybrid between HPLC and GC apparatuses, where the predominant modification is replacement of either the liquid or gas mobile phase with a supercritical fluid (or near supercritical fluid) mobile phase, such as with $CO_2$. In SFC, the mobile phase is initially pumped as a liquid or gas and is brought into the supercritical region by heating or pressurizing the mobile phase above its supercritical temperature/pressure prior to entry into a column. As the mobile phase passes through an injection valve, the sample is introduced into the supercritical stream, and the mixture is then transferred into a column. The mixture passes through the column (at supercritical or liquid state) and into the detector.

In general, the mobile phase in SFC processes have the ability to act both as substance carriers (like the mobile phases in GC), and dissolve substances readily (like the solvents used in LC). In addition to generally having lower viscosities and better diffusion profiles similar to those of certain gases, the mobile phase in SFC processes also generally have high densities and dissolving capacities similar to those of certain liquids. For example, SFs' high densities (0.2-0.5 gm/cm$^3$) provide for their remarkable ability to dissolve large, non-volatile molecules, e.g., supercritical or near supercritical $CO_2$ readily dissolves n-alkanes, di-n-alkyl phthalates, and polycyclic and aromatic compounds. Since the diffusion of solutes in a SFC mobile phase is about ten times greater than that in liquids (about three times less than in gases), this results in a decrease in resistance to mass transfer in the column and allows for fast high resolution separation. Also, the solvation strength of the mobile phase in SFC processes is directly related to the fluid density. Thus, the solubility of solids can be easily manipulated by making slight changes in temperatures and pressures.

Another important property of the mobile phase in SFC processes is that it provides high resolution chromatography at much lower temperatures. For example, an analyte dissolved in supercritical $CO_2$ can be recovered by reducing the pressure and allowing the sample to evaporate under ambient laboratory conditions. This property is useful when dealing with thermally unstable analytes, such as high molecular weight biopolymers or proteins. The combination of one or more mechanical or column changes to an SFC instrument (e.g., a $CO_2$-based chromatography instrument) coupled with the inherent properties of the SFC itself, allows for the separation of both chiral and achiral compounds, and has become increasingly predominant in the field of preparatory separations for drug discovery and development. Despite considerable advances in SFC technology, there is a need to develop innovative methods and apparatuses that improve the use of SFC. Controlling and stabilizing the pressure in an SFC instrument by one or more process and/or improving one or more of the instrumental characteristics of the system, may lead to, amongst others, improved compound separation and efficiency.

For example, better resolution and increased flow rate would decrease cycle times (i.e., shorter cycle times) and allow for improved separation of both chiral and achiral compounds, and lead to an overall increase in laboratory efficiency; increased speed and throughput would decrease the amount of solvent and cost(s) associated with SFC; and the ability to further integrate SFC with other detection methods, such as Mass Spectrometry (MS), Flame Ionization Detectors (FID), and Ultraviolet/Visible (UV) detectors, would improve the mainstream use of SFC using a mobile phase including $CO_2$ as an eco-friendly, yet effective, alternative method for the fast, complete, and sensitive analysis of analytes.

Exemplary embodiments of the present disclosure are directed to generating a near or substantially constant force solenoid assembly for use in a pressure regulator in a flow system. Exemplary embodiments can implement one or more systems and/or methods for generating a constant or substantially constant force (e.g., minimize force variation) solenoid assembly to provide a substantially linear force over a portion of its operating stroke so that the solenoids, as modified by the present technology, can be used in a pressurized flow system to accurately regulate pressure. As an example, in one embodiment, a solenoid's force, current and stroke are characterized, a linear (e.g., substantially linear) region with sufficient loads for actuator operation at desired currents is identified, shims or other spacers are used to position the solenoid within a device, such as a pressure regulator, to account for a non-linear stroke region prior to the identified linear region, and one or more springs are applied to the solenoid to minimize a force load profile in an operating region.

As used herein, the terms "downstream" and "upstream" refer to relative locations in a system flow, wherein upstream refers to being associated with an earlier portion of the system flow compared to a later portion of the system flow and downstream refers to being associated with a later portion of the system flow compared to an earlier portion of the system flow.

Figure 2:
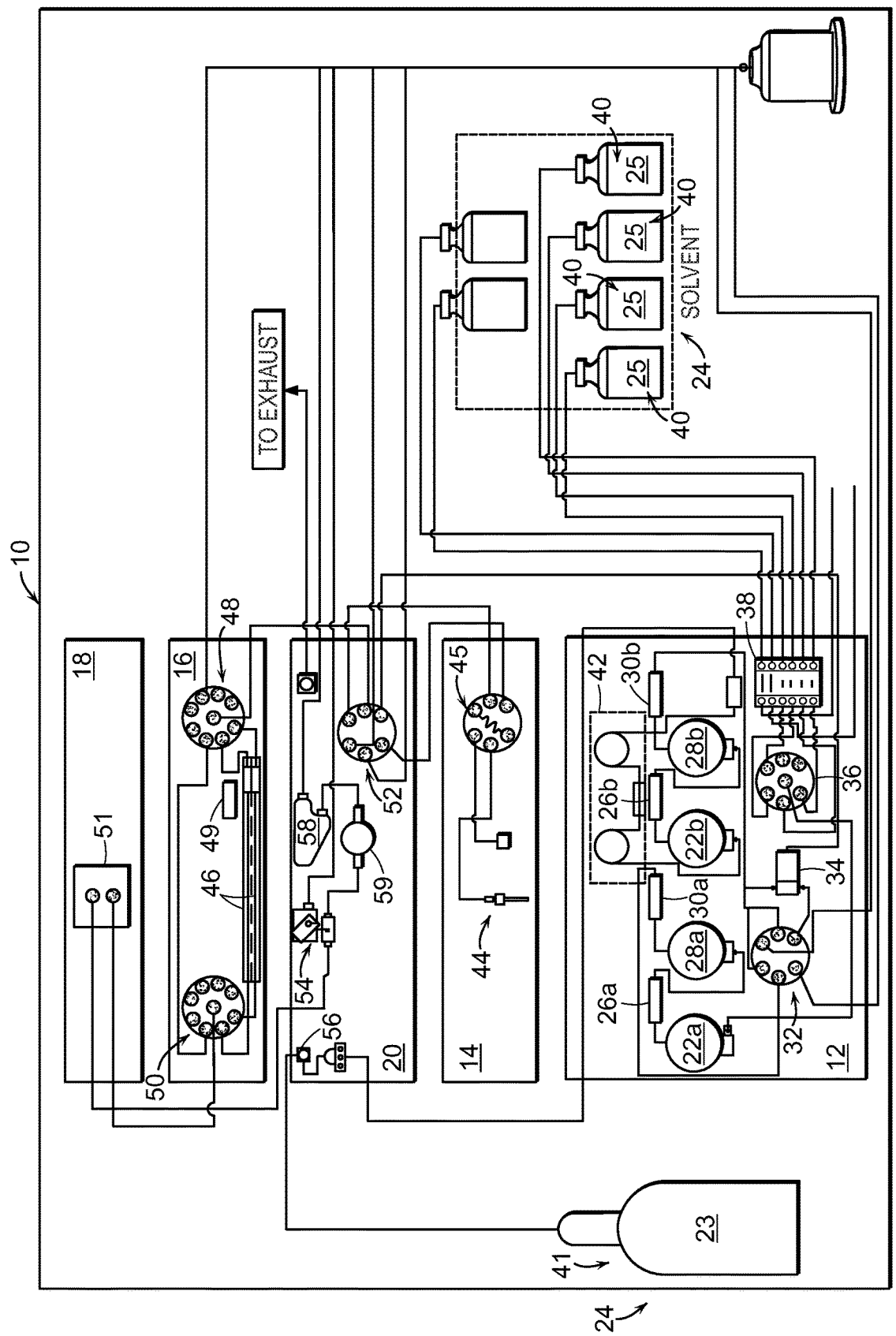
FIG. 2 is a block diagram of an exemplary pressurized flow system.

FIG. 2 is a block diagram of an exemplary pressurized flow system, which in the present embodiment is implemented as a $CO_2$-based chromatography system 10 (hereinafter "system 10"). While the present embodiment is illustrative of a $CO_2$-based chromatography system operated at or near supercritical conditions, those skilled in the art will recognize that exemplary embodiments of the present disclosure can be implemented as other pressurized flow systems and that one or more system components of the present disclosure can be implemented as components of other pressurized systems. System 10 can be configured to detect sample components of a sample using chromatographic separation in which the sample is introduced into a mobile phase that is passed through a stationary phase. System 10 can include one or more system components for managing and/or facilitating control of the physical state of the mobile phase, control of the pressure of system 10, introduction of the sample to the mobile phase, separation of the sample into components, and/or detection of the sample components, as well as venting of the sample and/or mobile phase from system 10.

Figure 3:
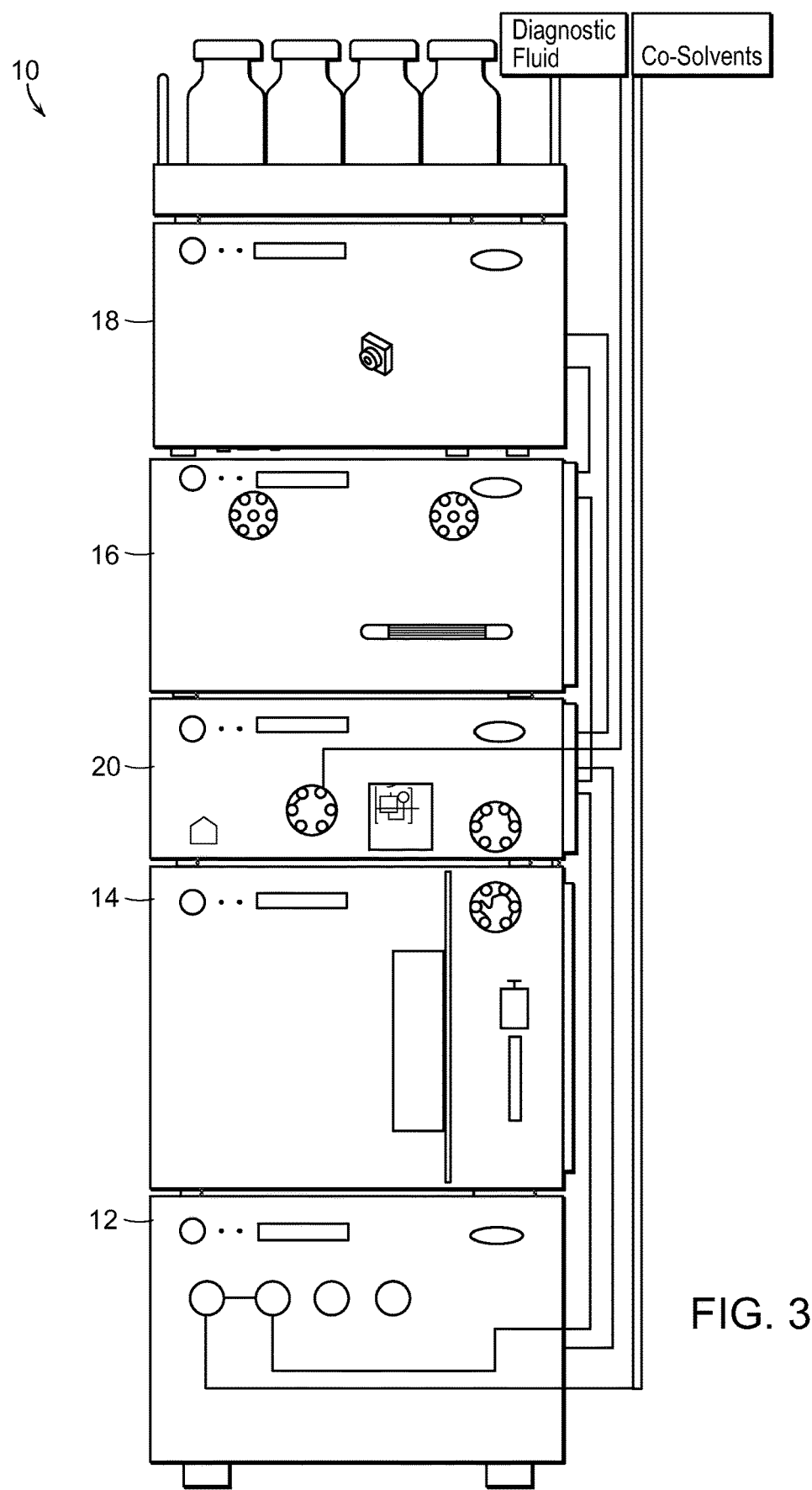
FIG. 3 is a block diagram of an exemplary arrangement of an embodiment of the system of FIG. 2.
Figure 4:
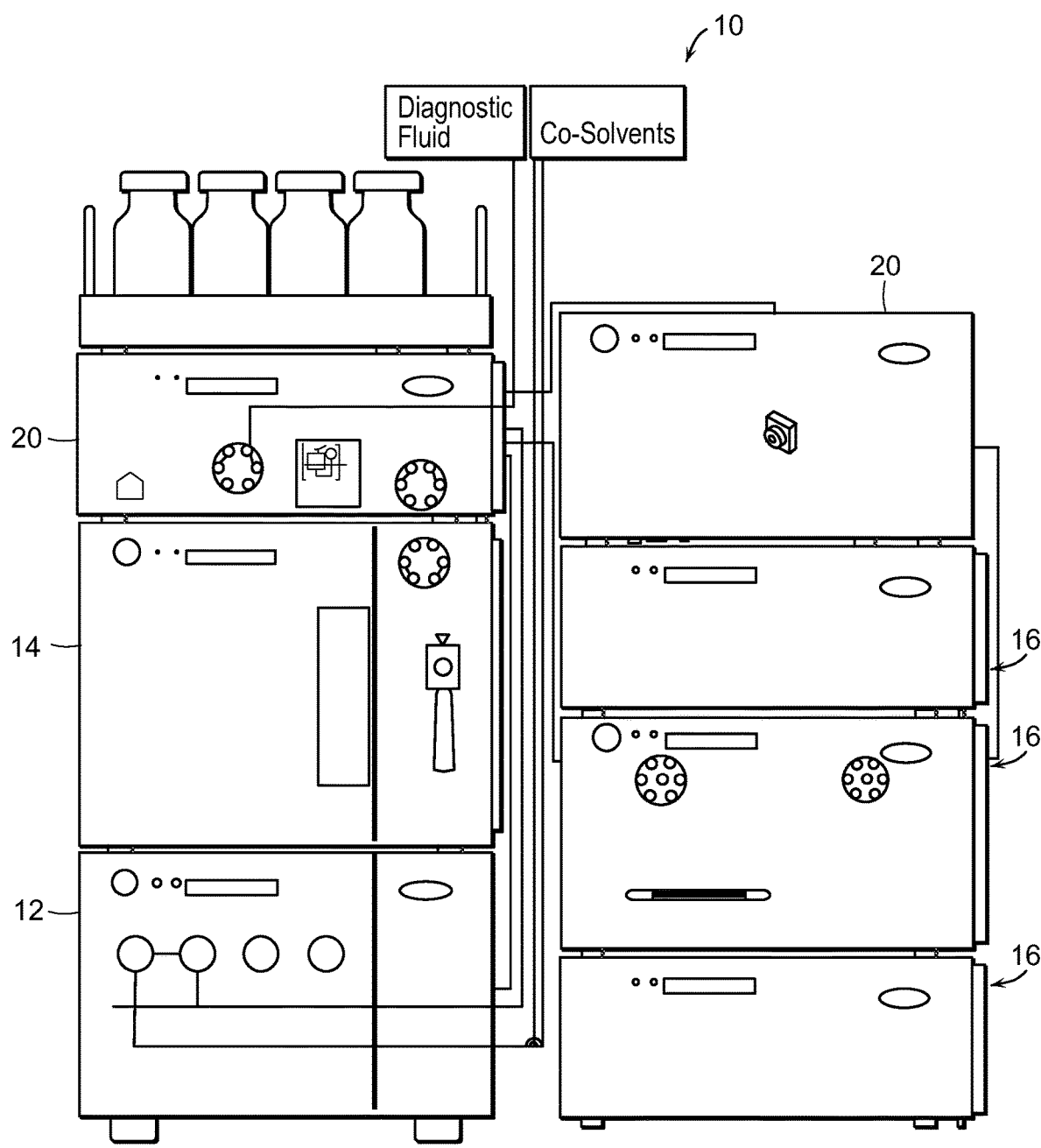
FIG. 4 is a block diagram of another exemplary arrangement of an embodiment of the system of FIG. 2.

In the present embodiment, system 10 can include a solvent delivery system 12, a sample delivery system 14, a sample separation system 16, a detection system 18 (e.g., a PDA detector), and a system/convergence manager 20. In some embodiments, the system components can be arranged in one or more stacks. As another example, in one embodiment, the system components of system 10 can be arranged in a single vertical stack (FIG. 3). The system components of system 10 can be arranged in multiple stacks (FIG. 4). Those skilled in the art will recognize that other arrangements of the components of the system 10 are possible. Furthermore, while embodiments of the system 10 have been illustrated as including system components 12, 14, 16, 18, and 20, those skilled in the art will recognize that embodiments of the system 10 can be implemented as a single integral unit, that one or more components can be combined, and/or that other configurations are possible.

The solvent delivery system 12 can include one or more pumps 22a and 22b configured to pump one or more solvents 24, such as mobile phase media 23 (e.g., carbon dioxide) and/or modifier media 25 (i.e., a co-solvent, such as, e.g., methanol, ethanol, 2-methoxyethanol, isopropyl alcohol, or dioxane), through system 10 at a predetermined flow rate. For example, the pump 22a can be in pumping communication with the modifier media 25 to pump the modifier media 25 through the system 10, and the pump 22b can be in pumping communication with the mobile phase media 23 to pump the mobile phase media 23 through system 10. An output of the pump 22a can be monitored by a transducer 26a and an output of the pump 22b can be monitored by a transducer 26b. The transducers 26a and 26b can be configured to sense the pressure and/or flow rate associated with the output of the solvent 24 from the pumps 22a and 22b, respectively. In some embodiments, pump 22a and/or 22b further includes a pump control valve configured to be actuated into, e.g., a flow position, a block position, a vent position, and the like.

The outputs of the pumps 22a and 22b can be operatively coupled to an input of accumulators 28a and 28b, respectively. The accumulators 28a and 28b are refilled by the outputs of the pumps 22a and 22b, respectively, and can contain an algorithm to reduce undesired fluctuations in the flow rate and/or pressure downstream of the pumps 22a and 22b, which can cause detection noise and/or analysis errors on the system 10. An output of the accumulator 28a can be monitored by a transducer 30a and an output of the accumulator 28b can be monitored by a transducer 30b. The transducers 30a and 30b can be configured to sense pressure and/or flow rate at an output of the accumulators 28a and 28b, respectively. The outputs of the accumulators 28a and 28b can be operatively coupled to a multiport valve 32, which can be controlled to vent the solvent 24 (e.g., mobile phase media 23 and modifier media 25) being pumped by the pumps 22a and 22b and/or to output the solvent 24 to a mixer 34. The mixer 34 can mix the modifier media 25 and the mobile phase media 23 output from the pumps 22a and 22b, respectively (e.g., after first passing through the accumulators 28a and 28b) and can output a mixture of the mobile phase media 23 and the modifier media 25 to form a solvent stream (i.e., mobile phase) that flows through the system 10. The output of the mixer 34 can be operatively coupled to the system/convergence manager 20 as discussed in more detail below.

In exemplary embodiments, the solvent delivery system 12 can include a multiport solvent selection valve 36 and/or a degasser 38. The solvent selection valve 36 and/or the degasser 38 can be operatively disposed between an input of the pump 22a and solvent containers 40 such that the solvent selection valve 36 and/or the degasser 38 are positioned upstream of the pump 22a. The solvent selection valve 36 can be controlled to select the modifier media 23 to be used by the system 10 from one or more solvent containers 40 and the degasser 38 can be configured to remove dissolved gases from the media modifier 23 before the media modifier 23 is pumped through the system 10.

In exemplary embodiments, the solvent delivery system 12 can include a pre-chiller 42 disposed between an input of the pump 22b and a solvent container 41 such that the pre-chiller is disposed upstream of the input to the pump 22b and downstream of the solvent container 41. The pre-chiller 42 can reduced the temperature of the mobile phase media 23 before it is pumped through the system 10 via the pump 22b. In the present embodiment, the mobile phase media 23 can be carbon dioxide. The pre-chiller can decrease the temperature of the carbon dioxide so that the carbon dioxide is maintained in a liquid state (i.e., not a gaseous state) as it is pumped through at least a portion of the system 10. Maintaining the carbon dioxide in a liquid state can facilitate effective metering of the carbon dioxide through the system 10 at the specified flow rate.

The pumps 22a and 22b can pump the solvent 24 through the system 10 to pressurize system 10 to a specified pressure, which may be controlled, at least in part, by the system/convergence manager 20. In exemplary embodiments, the system 10 can be pressurized to a pressure between about 700 psi and about 18,000 psi or about 1,400 psi and about 8,000 psi. In one embodiment, the system 10 can be pressurized to a pressure of about 6,000 psi. By pressurizing the system 10 at these pressure levels (such as those pressure levels described above), the solvent stream (i.e., mobile phase) can be maintained in a liquid state before transitioning to a supercritical fluid state or near supercritical state (e.g., highly-compressed gas or compressible liquid) for a chromatographic separation in a column, which can be accomplished by raising the temperature of the pressurized solvent stream.

The sample delivery system 14 can select one or more samples to be passed through the system 10 for chromatographic separation and detection. The sample delivery system 14 can include a sample selection and injection member 44 and a multi-port valve 45. The sample selection and injection member 44 can include a needle through which the sample can be injected into the system 10. The multiport valve 45 can be configured to operatively couple the sample selection and injection member 44 to an input port of the system/convergence manager 20.

The sample separation system 16 can receive the sample to be separated and detected from the sample delivery system 14, as well as the pressurized solvent stream from the solvent delivery system 12, and can separate components of the sample passing through the system 10 to facilitate detection of the samples using the detection system 18. The sample separation system 16 can include one or more columns 46 disposed between an inlet valve 48 and an outlet valve 50. The one or more columns 46 can have a generally cylindrical shape that forms a cavity, although one skilled in the art will recognize that other shapes and configurations of the one or more columns is possible. The cavity of the columns 46 can have a volume that can at least partially be filled with retentive media, such as hydrolyzed silica, such as $C_8$ or $C_{18}$, or any hydrocarbon, to form the stationary phase of the system 10 and to promote separation of the components of the sample. The inlet valve 48 can be disposed upstream of the one or more columns can be configured to select which of the one or more columns 46, if any, receives the sample. The outlet valve 50 can be disposed downstream of the one or more columns 46 to selectively receive an output from the one or more columns 46 and to pass the output of the selected one or more columns 46 to the detection system 18. The columns 46 can be removably disposed between the valves 48 and 50 to facilitate replacement of the one or more columns 46 to new columns after use. In some embodiments, multiple sample separation systems 16 can be included in the system 10 to provide an expanded quantity of columns 46 available for use by the system 10 (FIG. 4).

In exemplary embodiments, the sample separation system 16 can include a heater 49 to heat the pressurized solvent stream 24 prior and/or while the pressured solvent stream 24 passes through the one or more columns 46. The heater 49 can heat the pressurized solvent stream to a temperature at which the pressured solvent transitions from a liquid state to a supercritical fluid state so that the pressurized solvent stream passes through the one or more columns 46 as a supercritical fluid.

Referring again to FIG. 2, the detection system 18 can be configured to receive components separated from a sample by the one or more columns 46 and to detect a composition of the components for subsequent analysis. In an exemplary embodiment the detection system 18 can include one or more detectors 51 configured to sense one of more characteristics of the sample components. For example, in one embodiment, the detectors 51 can be implemented as one or more photodiode arrays.

The system/convergence manager 20 can be configured to introduce a sample from the sample delivery system 14 into the pressurized solvent stream flowing from the solvent delivery system 12 and to pass the solvent stream and sample to the sample separation system 16. In the present embodiment, the system/convergence manager 20 can include a multiport auxiliary valve 52 which receives the sample injected by the sample delivery system 14 through a first inlet port and the pressurized solvent stream from the solvent delivery system 12 through a second inlet port. The auxiliary valve 52 can mix the sample and the solvent stream and output the sample and solvent stream via an outlet port of the multiport auxiliary valve 52 to an inlet port of the inlet valve 48 of the sample separation system 16.

The system/convergence manager 20 can also be configured to control the pressure of the system 10 and to facilitate cooling, heating, and/or venting of the solvent from the system 10, and can include a vent valve 54, a shut off valve 56, a back pressure regulator 58, and a transducer 59. The vent valve 54 can be disposed downstream of the detection system 18 can be configured to decompress the system 10 by venting the solvent from the system 10 after the solvent has passed through the system 10. The shut-off valve 56 can be configured to disconnect the solvent supply from the inlet of the pump 22b of the solvent delivery system to prevent the solvent from being pumped through the system 10. An exemplary vent valve 54 will be described in more detail below.

The back pressure regulator 58 can control the back pressure of the $CO_2$-based chromatography system 10 to control the flow of the mobile phase and sample through the column, to maintain the mobile phase in the supercritical fluid state (or, in some embodiments, in a near supercritical state, such as, a highly-compressed gas or compressible liquid) as the mobile phase passes through the one or more columns 46 of the sample separation system 16, and/or to prevent the back pressure from forcing the mobile phase reversing its direction a flow through the one or more columns 46. Embodiments of the back pressure regulator 58 can be configured to regulate the pressure of the system 10 so that the physical state of the solvent stream (i.e., mobile phase) does not change uncontrollably upstream of and/or within the back pressure regulator 58. The transducer 59 can be a pressure sensor disposed upstream of the back pressure regulator 58 to sense a pressure of the system 10. The transducer 59 can output a feedback signal to a processing device which can process the signal to control an output of an actuator control signal from the processing device.

Figure 5:
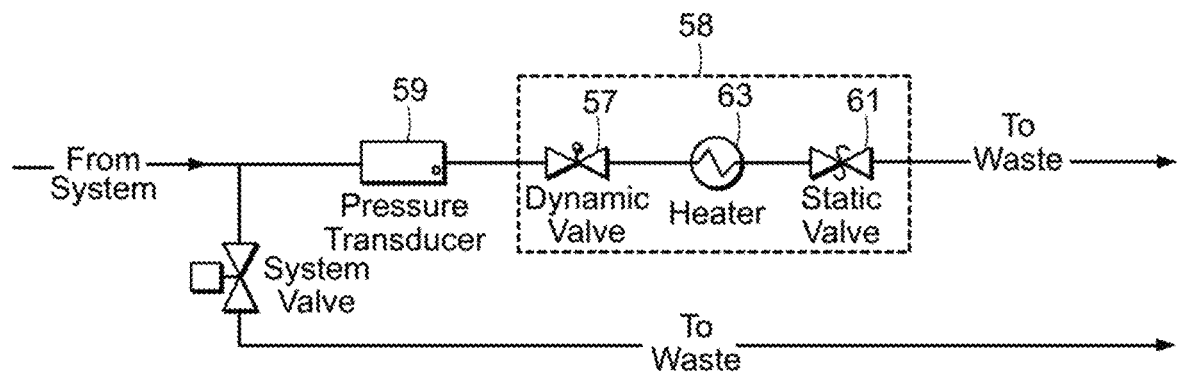
FIG. 5 is a flow diagram of a mobile phase through a system manager portion of the an exemplary embodiment of the pressurized flow system.

In exemplary embodiments, as shown in FIG. 5, the back pressure regulator 58 can include a dynamic pressure regulator 57, a static pressure regulator 61, and a heater 63. The static pressure regulator 61 can be configured to maintain a predetermined pressure upstream of the back pressure regulator 58. The dynamic pressure regulator 57 can be disposed upstream of the static pressure regulator 61 and can be configured to set the system pressure above the predetermined pressure maintained by the static regulator 61. The heater 63 can be disposed downstream of the dynamic pressure regulator 57 and can be disposed in close proximity to the static pressure regulator 61 to heat the solvent stream as it passes through the static pressure regulator 61 to aid in control of the physical state of the solvent as it passes through the static pressure regulator.

In summary, an exemplary operation of the $CO_2$-based chromatography system 10 can pump mobile phase media 23 and modifier media 25 at a specified flow rate through the system 10 as a solvent stream (i.e., mobile phase) and can pressurize the system 10 to a specified pressure so that the solvent stream maintains a liquid state before entering the sample separation system 16. A sample can be injected into the pressurized solvent stream by the sample delivery system 14, and the sample being carried by the pressurized solvent stream can pass through the sample separation system 16, which can heat the pressurized solvent stream to transition the pressurized solvent stream from a liquid state to a supercritical fluid state. The sample and the supercritical fluid solvent stream can pass through at least one of the one or more columns 46 in the sample separation system 16 and the column(s) 46 can separate components of the sample from each other. The separated components can pass the separated components to the detection system 18, which can detect one or more characteristics of the sample for subsequent analysis. After the separated sample and solvent pass through the detection system 18, the solvent and the sample can be vented from the system 10 by the system/convergence manager 20.

In other embodiments, the system 10 described herein can also be used for preparatory methods and separations. Typical parameters, such as those described above, may be manipulated to achieve effective preparatory separations. For example, the system 10 described herein confers the benefit of exerting higher flow rates, larger columns, and column packing size, each of which contributes to achieving preparatory separation and function, while maintaining little or no variability in overall peak shape, peak size, and/or retention time(s) when compared to respective analytical methods and separations thereof. Thus, in one embodiment, the present disclosure provides $CO_2$-based chromatography systems which are amendable to preparatory methods and separations with high efficiency and correlation to analytical runs.

Figure 6:
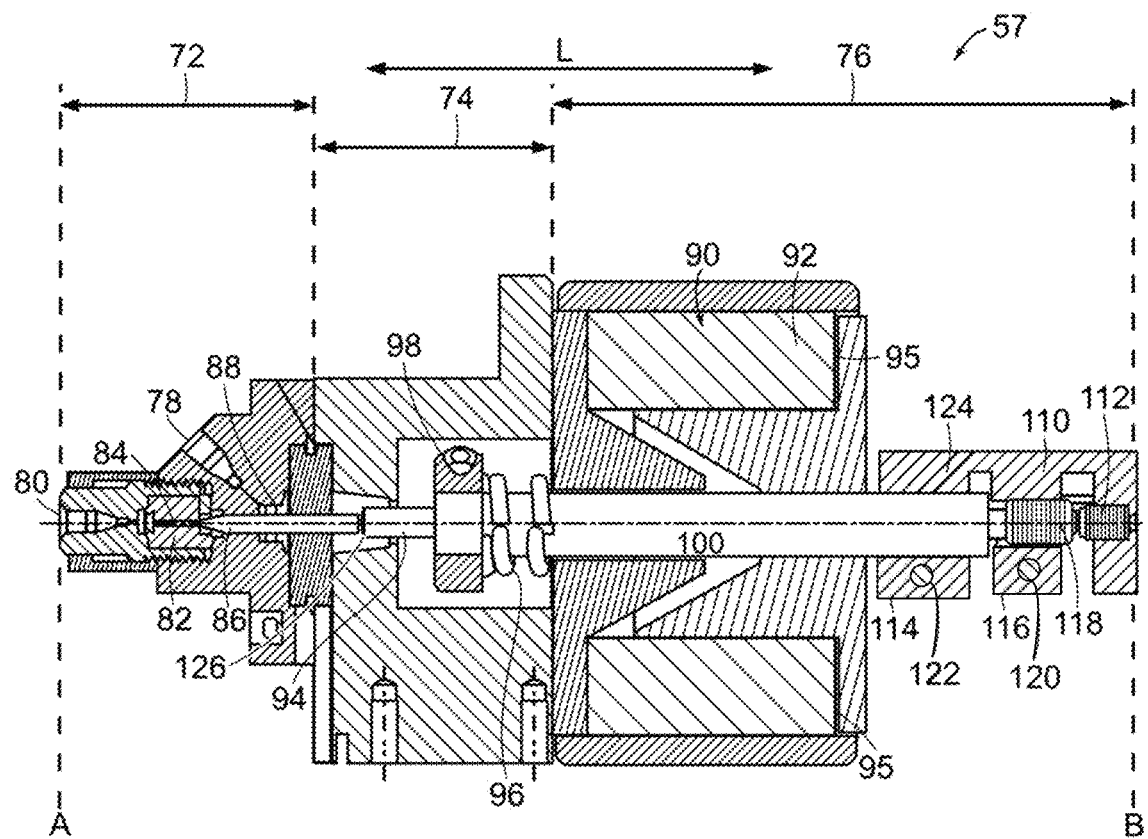
FIG. 6 is a cross-sectional view of a valve assembly for an exemplary dynamic pressure regulator in an exemplary embodiment of the pressurized system.

FIG. 6 is a cross-sectional view of an exemplary embodiment of a dynamic pressure regulator 57 along a longitudinal axis L of the dynamic pressure regulator. The dynamic pressure regulator 57 can be implemented as a valve assembly that includes a proximal head portion 72, an intermediate body portion 74, and a distal actuator portion 76. The head portion 72 of the valve assembly can include an inlet 78 to receive the pressurized solvent stream and an outlet 80 through which the pressurized solvent stream is output such that the solvent stream flows through the head portion from the inlet 78 to the outlet 80. A seat 82 can be disposed within the head portion 72 and can include a bore 84 through which the solvent stream can flow from the inlet 78 to the outlet 80 of the head.

A needle 86 extends into the head portion 72 from the body portion 74 of the valve assembly through a seal 88. A position of the needle 86 can be controlled with respect to the seat 82 to selectively control a flow of the solvent stream from the inlet 78 to the outlet 80. In exemplary embodiments, the position of the needle 86 can be used to restrict the flow through the bore 84 of the seat 82 to increase the pressure of the system 10 and can selectively close the valve by fully engaging the seat 82 to interrupt the flow between the inlet 78 and the outlet 80. By controlling the flow of the solvent stream through the head portion based on the position of the needle 86, the pressure of the system 10 can be increased or decreased. For example, the pressure of the system 10 can generally increase as the needle 86 moves towards the seat 82 along the longitudinal axis L and can generally decrease as the needle 86 moves away from the seat 82 along the longitudinal axis L.

The actuator portion 76 can include an actuator 90, such as a solenoid, voice coil, and/or any other suitable electromechanical actuation device. In the present embodiment, the actuator 90 can be implemented using a solenoid having a main body 92 and a shaft 94. The shaft 94 can extend along the longitudinal axis L and can engage a distal end of the needle 86 such that the needle 86 and shaft can form a valve member. A position of the shaft 94 can be adjustable with respect to the main body 92 along the longitudinal axis L and can be controlled by a coil (not shown) of the main body 92, which generates a magnetic field that is proportional to an electric current passing through the coil and a load applied to the shaft. The electric current passing through the coil can be controlled in response to an actuator control signal received by the actuator 90. In some embodiments, the actuator control signal can be a pulse width modulated (PWM) signal and/or the actuator control signal can be determined, at least in part, by the feedback signal of the pressure transducer 59.

The position of the shaft 94 can be used to move the needle 86 towards or away from the seat 82 to increase or decrease pressure, respectively. In exemplary embodiments, a position of the shaft 94, and therefore a position of the needle 86 with respect to the seat 82 can be controlled and/or determined based on an amount of electric current flowing through the solenoid. For example, the greater the electrical current the closer to the needle 86 and shaft 94 are from the seat and the higher the pressure is in the system 10. The relationship between a position of the shaft 94 and the electric current flowing through the coil can be established through characterization of the actuator 90. The force imposed by the load on the solenoid can be proportional to the magnetic field. Similarly, the magnetic field can be proportional to the electric current flowing through the coil of the solenoid. For embodiments in which the actuator control signal is implemented as a PWM control signal, the pressure through the pressure regulator 57 (e.g., force balance between needle 86 and shaft 94) can be set by a correlation to the duty cycle of the PWM control signal, e.g., a percentage of the duty cycle corresponding to an "on" state.

Figure 13:
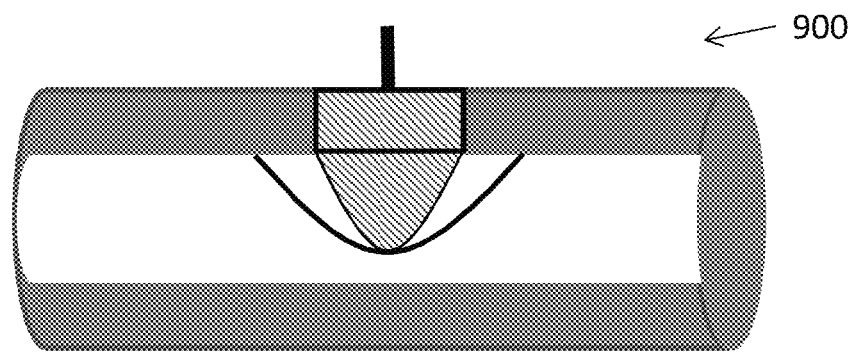
FIG. 13 is an enlargement of a portion of a cross-sectional view of a valve assembly for an exemplary dynamic pressure regulator in an exemplary embodiment of the pressurized system.

The force imposed by the actuator 90 to set the pressure through the pressure regulator 57 can be manipulated for force control purposes by inclusion of a compressed spring 96. Spring 96 is compressed by collar 98 to apply a normalizing force to the actuator 90 through an exterior shaft liner 100. The normalizing force assists in providing a linear load force throughout the cycle of the actuator 90. In general, commercially available solenoid (i.e. solenoids not modified as described herein, e.g., without spring 96) provide a nonlinear force along their operating stroke making their use undesirable for control purposes. In addition, actuator/solenoid 90 has a negative spring rate, such that shaft 94 when the actuator 90 is in an inactive state is forced in a direction opposite of outlet 90 (i.e., towards the end of the device labeled B along axis L) such that the force reduces as the solenoid stroke increase. To compensate for this force, compressed spring 96 applies a pressure to shaft 94 to counterbalance the negative spring rate of the actuator 90. In some embodiments, the spring rate selected for compressed spring 96 has a value that not only counterbalances but also applies a positive spring rate such that shaft 94 moves towards the end of the device labeled A. In addition a shim (e.g., a non-magnetic shim, such as, for example a plastic shim, a non-magnetic metal shim, or a void) is positioned within the main body 92 to create a distance or a gap 95 for minimization of force variation purposes (e.g., to further generate a near constant force from the solenoid). See, for example, void 95' in FIG. 6. That is, gap 95 prevents the actuator 90 from a completely closed state. Gap 95 is to account for an initial highly nonlinear force region with the solenoid's stroke (i.e., a portion of the stroke adjacent to the completely closed state in which the force generated is far from linear). The gap 95 removes the effects of the highly nonlinear region (e.g., region adjacent to the completely closed state) from the solenoid's stroke for control purposes. Methods of selection of the preloading conditions of spring 96 and distance of gap 95 to minimize force variation along the operating stroke of the solenoid are further provided below. FIG. 13 shows non-magnetic shim 950.

To regulate pressure through device 57 from inlet 78 to outlet 80, the needle 86 and seat 82 are carefully positioned relative to one another. A calibrated position between the needle 86 and seat 82 is set at the position when the needle 86 first engages the bore 84 of the seat 82 to stop the flow of solvent. In general, care is taken to set this calibrated position, such that the needle 86 will not be jammed into the bore 84 during operation of pressure regulator 57. It is believed that prevention or at least minimization of the needle being jammed into the bore will extend the life of the pressure regulator and/or increase the working lifetime prior to a maintenance event.

During the lifetime of the pressure regulator 57, components, such as, for example the needle 86 or the seat 82 can become worn. These components may be replaced in maintenance events. After the maintenance event, the needle and seat need to be placed back into the calibration position.

Exemplary embodiments of the pressure regulator 57 include a calibration collar 110 secured to the shaft 94 to automatically (e.g., mechanically) reset the calibration position. That is, the calibration collar 110 applies a force on shaft 94 to lock further extension of the shaft 94. When the calibration collar 110 is secured onto shaft 94, a maintenance provider or user merely needs to position the shaft 94 in physical contact with the distal end of the needle and lock the calibration collar to mechanically set needle 86 relative to the seat 82 in the calibrated position.

To apply the force, the calibration collar 110 includes a spring 112 and two locking mechanisms 114 and 116. Locking mechanism 114 holds the calibration collar 110 to the exterior liner 100 of the shaft 94, whereas locking mechanism 116 grips the distal end 118 of the shaft 94 to clamp or lock the extended position of the shaft 94 to prevent jamming of the needle 86 into the seat 82. In the embodiment shown in FIG. 6, the locking mechanisms include fasteners 120 and 122 to secure a housing 124 forming the calibration collar 110 to the actuator 90.

The housing 124 of the calibration collar 110 is typically formed of a metal, such as, stainless steel or aluminum. Locking mechanisms 114 and 116 can be integrally formed into at least a portion of housing 124.

During a maintenance event, the actuator 90 is inactivated (i.e., no signal is applied to drive the solenoid) and the flow of solvent is stopped. The needle 86 and seat 82 are in the calibrated position at the start of the maintenance event. That is, the needle 86 engages seat 82 to block bore 84. The calibration collar 110 attached to the shaft 94 as shown in FIG. 6 holds the needle and seat in this calibrated position. To obtain access to the distal end of the needle 86 and potentially to the seat, shaft 94 needs to be pulled back towards end B. In the calibration collar's configuration with both fasteners 120 and 122 secured, alignment of the needle 86, seat 82, and shaft 94 is maintained. However, to release this secured position, the user merely needs to loosen fastener 120 to release the grip of locking mechanism 116 from the distal end 118 of the shaft 94. The fastener 122 remains securely tightened or closed such that locking mechanism 114 continues to hold the housing 124 of the calibration collar 110 to the exterior liner 100. However, distal end 118 of the shaft 94 is free to move to allow access to the needle/seat for maintenance. At the conclusion of the maintenance event, the user places the proximal end 126 of the shaft 94 in contact with the needle 86 and tightens fastener 120 to reposition the needle 86 relative to the seat an in the calibrated position.

The spring 112 of the calibration collar 110 has a spring rate constant which is less than (e.g., far less than) a rate of compressed or balanced spring 96. As a result, compressed spring 96 dominates with respect to force balance and positioning of the shaft 94 within an inactive (e.g., no signal applied) solenoid 90. To provide minimization of force variation throughout an operating stroke of the solenoid 90, the spring rate of a counterbalancing force (e.g., spring 96 as compressed by collar 98) and gap distance (e.g., shim thickness) 95 are determined through a characterization of the solenoid's force, current, and stroke.

Figure 7:
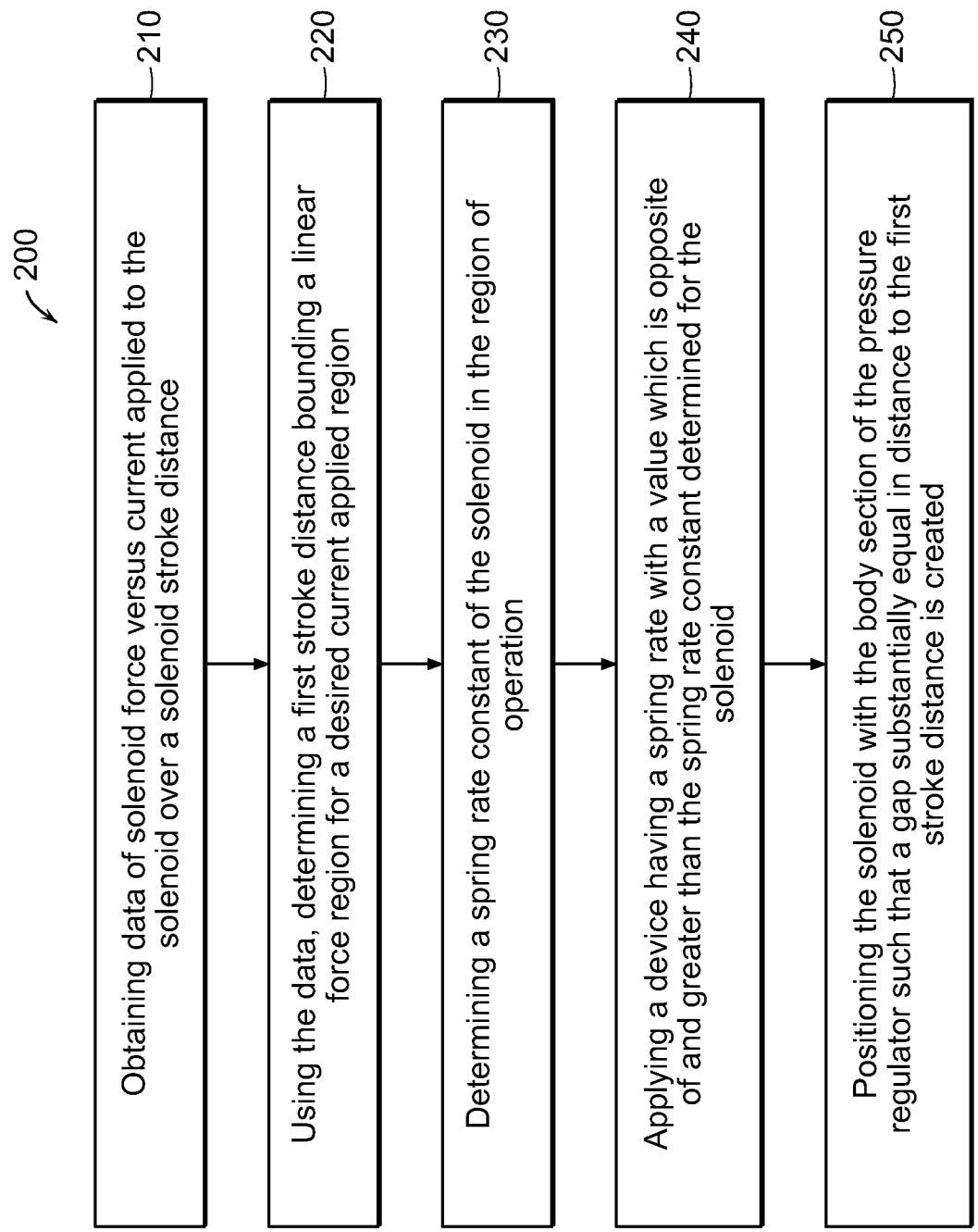
FIG. 7 is a flowchart illustrating an exemplary method for minimization of force variation in a solenoid driven pressure regulator.

FIG. 7 illustrates an exemplary method 200 for minimization of force variation in a solenoid for use as an actuator in a pressure regulator. As described above, commercially available solenoids generate a nonlinear force along their stroke making them undesirable for use as force control devices in pressure regulators. The method illustrated in FIG. 7 modifies a solenoid to create a near constant or substantially constant force throughout the solenoid's intended operating stroke. The method shown in FIG. 7 creates a substantially constant force by minimization of force variation within the operating stroke of a modified solenoid, so as to minimize or eliminate undesirable force control qualities which have prevented or limited the use of solenoids for this purpose.

Figure 8:
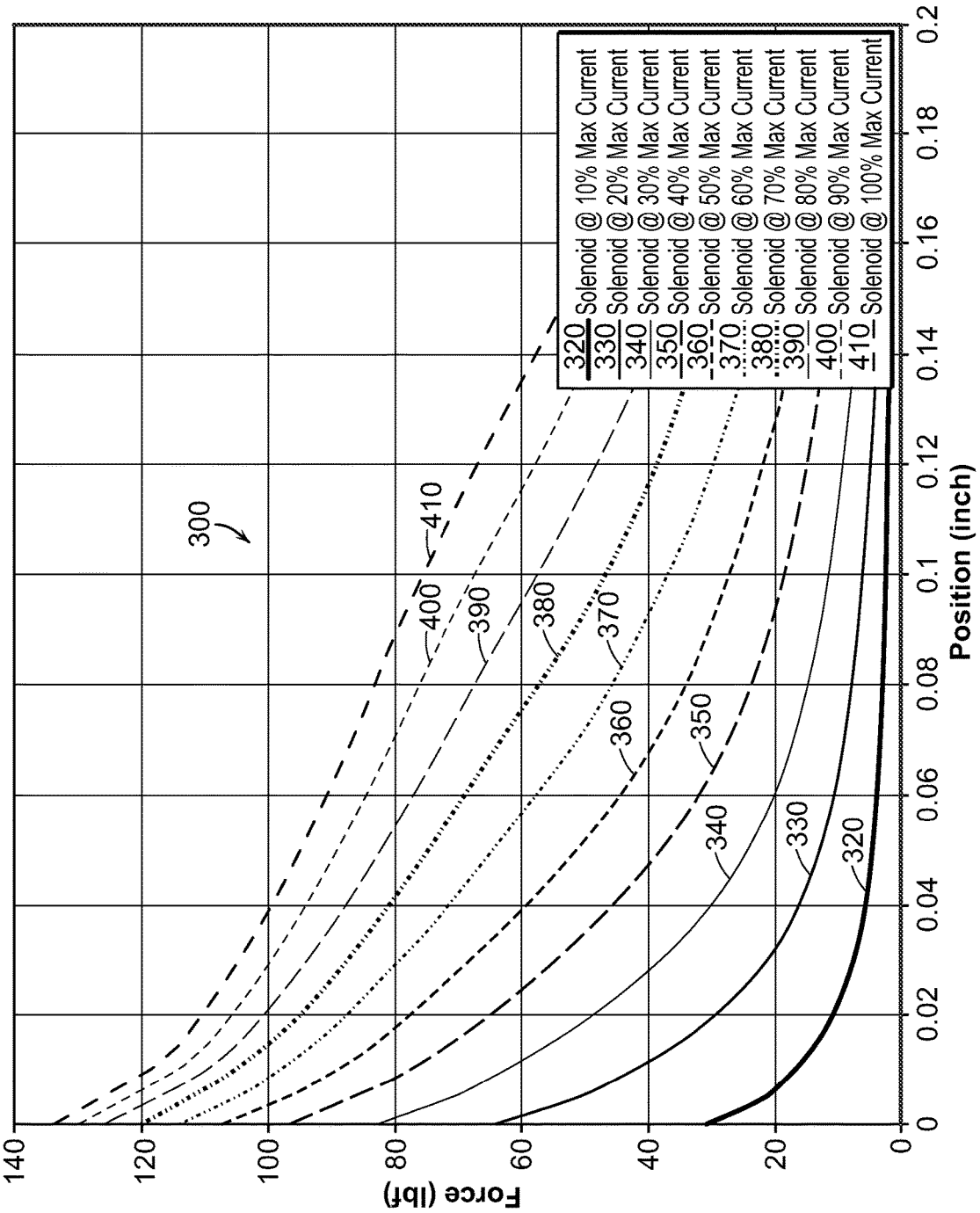
FIG. 8 is a graph showing force, current, and stoke position data used in the characterization of a solenoid.

Method 200 shown in FIG. 7 has five steps and is generally conducted just once, at the time of manufacture of the solenoid force driven device (e.g., pressure regulator 57). However, in certain embodiments, method 200 can be performed after a maintenance event or during a reconfiguration event (e.g., replacement of the needle and/or seat to a different cross-sectional design configuration). The first step 210 of method 200 includes obtaining data of solenoid force versus current applied to the solenoid over a solenoid stroke distance. In step 210, the solenoid's performance is characterized at a particular temperature. FIG. 8, shows a representative graph 300 showing such a characterization for a solenoid, part number 191016-023, commercially available from Ledex, Ohio, USA. Plots 320-410 provide force versus shaft position for various percentages of current applied. From the characterization information, a first stroke distance bounding a linear force region for a desired current applied region is determined in step 220. That is, using a subset of the plots which correspond to the desired current applied (e.g., 30% to 70%, plots 340 to 380), step 220 identifies a region in which force changes linearly or substantially linearly.

Figure 9:
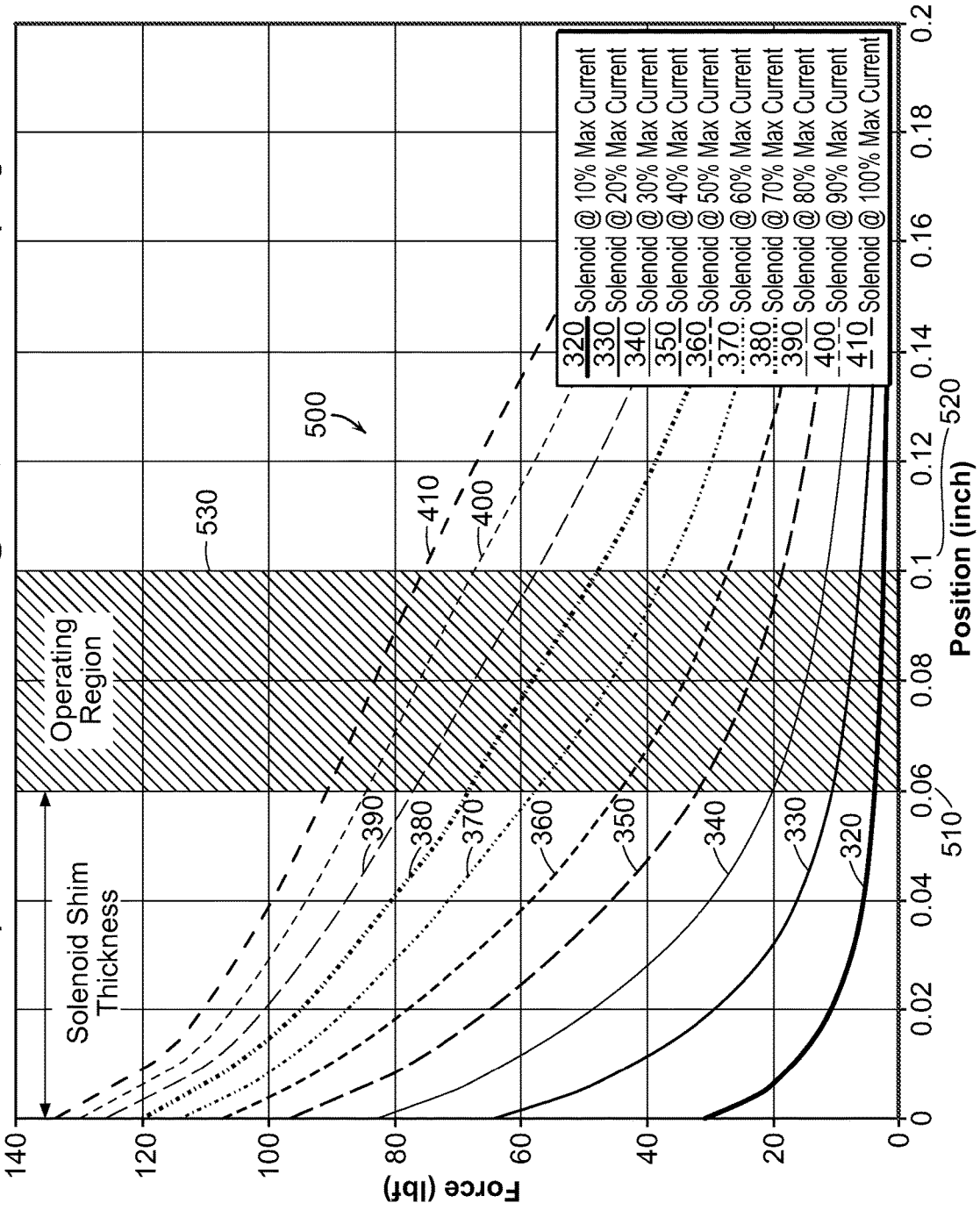
FIG. 9 is the graph of FIG. 8 with an operating region identified.

FIG. 9 illustrates an embodiment of an exemplary process 500 of how the first stroke distance bounding a linear force region or operating region 530 is determined That is, using plots 340 to 380 for a current applied region of 30% to 70% maximum current, a linear region of force over stroke distance is identified. The region is bound by a first position 510 and an end position 520 defining the operating region 530. In other embodiments, not shown, a current applied region of 10% to 80% maximum current is used. In still other embodiments, 25% to 75% maximum current is used. In still yet other embodiments, 35% to 65% maximum current is used. Each of these different embodiments can result in a different operating region being determined.

From the characterization data, information regarding a spring rate constant of the solenoid in the operating region 530 can also be determined—see, step 230 in method 200 shown in FIG. 7. For example, using plots 340 to 380, the spring constant (force per distance) in the region of operation 530 can be determined. In step 240, a device having a spring rate constant with a value opposite of and greater than the spring rate constant determined in the operating region is applied to the solenoid to counteract the spring rate constant of the commercially available solenoid. For example if the determined spring rate constant of the characterized solenoid is −620 pounds per inch (lbf) then a device (e.g., compressed coil or a Belleville stack) having a spring rate of about 650 lbf or greater is applied to the solenoid. The spring 96 can be compressed by collar 98 to apply a preload condition if desired. Other factors used for the selection of the spring rate constant for spring 96 include a review of all force requirements for the applied currents, such that a spring with the lowest stiffness resulting in an increase in force with displacement (e.g., stable force requirement) is utilized.

Figure 12:
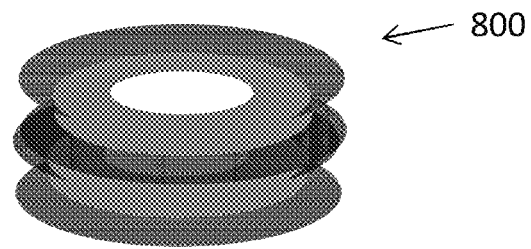
FIG. 12 is a cross-sectional view of a valve assembly for an exemplary dynamic pressure regulator in an exemplary embodiment of the pressurized system.

Non-linear Belleville stack spring 800 appears in FIG. 12.

Figure 10:
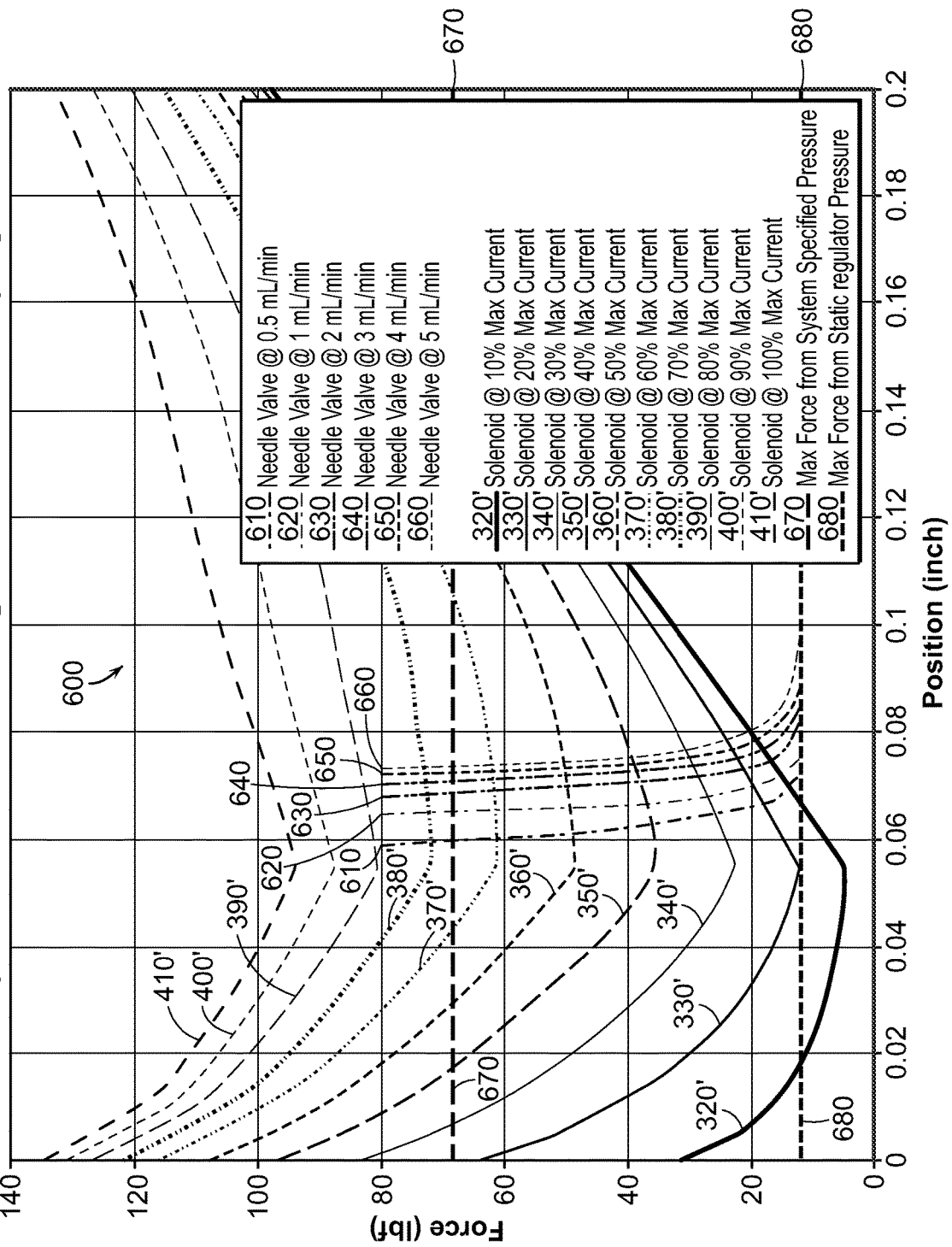
FIG. 10 is a graph using the characterization data of FIG. 8 as modified by the application of a counterbalancing force device, such as a spring, to the solenoid.

FIG. 10 illustrates the effect 600 of adding the balancing spring 96 to the solenoid. Plots 320' to 410' show the force versus position of the solenoid with compression spring 96 attached. FIG. 10 also illustrates the force created on a needle for various flow rates 610-660, corresponding to 0.5 mL/min to 5 mL/min FIG. 10 further shows the maximum upper force condition 670 and lower force condition 680 expected across the pressure regulator 57.

To minimize the force variation along the operating stroke in a pressure regulation device, such as pressure regulator 57, method 200 of FIG. 7 includes step 250 in which the solenoid is positioned within the body section such that gap 95 equal in distance to the first stroke distance 510 is created in the solenoid's operating stroke. As a result of creating this gap, the nonlinear operation portion of the solenoid is avoided and the counterbalanced solenoid generates a substantially constant force through the operating region. To create the gap 95, a non-magnetic material shim or spacer having a thickness corresponding to the distance prior to the operating region can be used to properly position the solenoid within the main body 92. (See, for example, gap 95 created in main body 92 shown in FIG. 6).

Figure 11B:
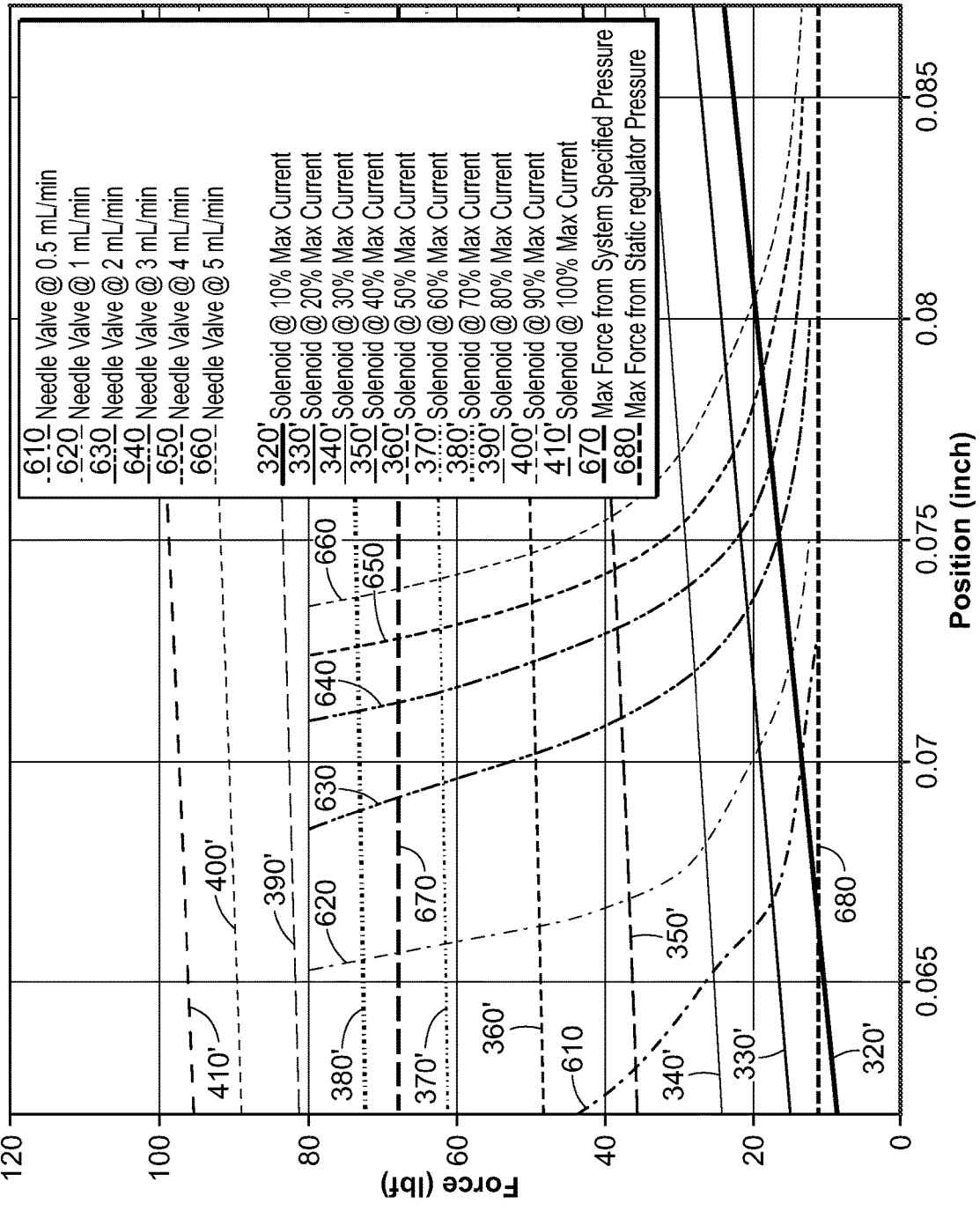

Referring to FIGS. 11a and 11b, shown is the result of applying spring 96 to the characterized solenoid and further showing the operating region 530 created by including gap 95 (formed, for example by placing a shim to position solenoid 90 within regulator 57). FIG. 11a shows the result over a distance of 0.2 inches (e.g., 0 to 0.2 inches), whereas FIG. 11b shows the stroke over an operating position from 0.06 inches to 0.085 inches. The operating stroke distance is 0.025 inches and the gap distance is 0.06. FIG. 11b shows that the force is substantially linear over the operating region for the pressure regulator.

There are numerous advantages provided by the above method. For example, the method provides a cost savings to the creation and operation of pressure regulators in flow systems. Embodiments of the method allow for inexpensive solenoids as modified by inexpensive assemblies provided herein (e.g., springs and spacers for gap positioning) to be used to control pressure in $CO_2$-based chromatography systems. The method not only provides cost savings due to the components used to manufacture the force driven devices, but also in operational costs as solenoids require minimal power requirements to generate force as compared to more expensive actuators, such as voice coils.

In addition to the above embodiments shown and described, other embodiments are also possible. For example, different solenoids have different qualities, which result in different characterization data being obtained. As the obtained data is used to determine the gap positions, operating region, and spring rate of the compressed spring 96 applied to the solenoids, different assemblies/solenoid modifications are possible. Further, while some of the embodiments of pressure regulators described herein have positioned the actuator (e.g., solenoid) in communication with a needle of a needle valve, other types of variable restrictor assemblies besides a needle valve can be utilized. For example, in some embodiments, the needle valve can be replaced with a diaphragm valve and the solenoid would be in communication with the diaphragm located therein. Diaphragm valve 900 is depicted in FIG. 12.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the technology.

The invention claimed is:

1. A pressure regulator comprising:
a body section;
a head section comprising a needle and a seat defining a bore, the needle and seat positioned such that movement of the needle within the bore of the seat creates a pressure differential through the seat when a flow of a fluid is supplied to the head section;
an actuator section located at least partially within the body section and positioned to communicate with the needle to move the needle within the bore of the seat, the actuator section including a shaft, a shaft liner, a compression collar connected to a first end of the shaft liner, and a balancing spring engaging with the compression collar and a body of a solenoid; and
a calibration collar releasably secured to a second end of the shaft liner and the shaft, the calibration collar configured to prevent movement of the shaft with respect to the shaft liner when in a locked position,
wherein the balancing spring applies a first force to the shaft, via the shaft liner and the compression collar, in a first direction toward the seat, and
wherein the solenoid applies a second force to the shaft in a second direction opposite the first direction when the solenoid is in a first state of operation, and a value of first force from the balancing spring is greater than a value of the second force from the solenoid, to provide a combined force to the shaft in the first direction.

2. The pressure regulator of claim 1, wherein the actuator section is positioned such that a distal end of the needle is disposed within the body section.

3. The pressure regulator of claim 1, further comprising a non-magnetic material shim or void disposed within the actuator section to create a gap within a region of actuation of the solenoid.

4. The pressure regulator of claim 1, wherein the balancing spring is preloaded to apply the positive spring rate with the compression collar.

5. The pressure regulator of claim 1, wherein the balancing spring is a linear spring.

6. The pressure regulator of claim 5, wherein the linear spring is a compression coil.

7. The pressure regulator of claim 1, wherein the balancing spring is a nonlinear spring.

8. The pressure regulator of claim 7, wherein the nonlinear spring is a Belleville stack.

9. A pressure regulator comprising:
an actuator section in communication with a variable restriction assembly, the actuator section including a shaft, a shaft liner, a compression collar connected to a first end of the shaft liner, and a balancing spring engaging with the compression collar and a body of a solenoid; and
a calibration collar releasably secured to a second end of the shaft liner and the shaft, the calibration collar configured to prevent movement of the shaft with respect to the shaft liner when in a locked position,
wherein the balancing spring applies a first force to the shaft, via the shaft liner and the compression collar, in a first direction toward the variable restriction assembly, and
wherein the solenoid applies a second force to the shaft in a second direction opposite the first direction when the solenoid is in a first state of operation, and a value of the first force from the balancing spring is greater than a value of the second force from the solenoid, to provide a combined force to the shaft in the first direction.

10. The pressure regulator of claim 9, further comprising a non-magnetic material shim or void disposed within the actuator section to create a gap within a region of actuation of the solenoid.

11. The pressure regulator of claim 9, wherein the balancing spring is preloaded to apply the positive spring rate with the compression collar.

12. The pressure regulator of claim 9, wherein the balancing spring is a linear spring.

13. The pressure regulator of claim 12, wherein the linear spring is a compression coil.

14. The pressure regulator of claim 9, wherein the balancing spring is a nonlinear spring.

15. The pressure regulator of claim 14, wherein the nonlinear spring is a Belleville stack.

16. The pressure regulator of claim 9, wherein the variable restriction assembly comprises a needle valve.

17. The pressure regulator of claim 9, wherein the variable restriction assembly comprises a diaphragm valve.

* * * * *